(12) United States Patent  
Fan

(10) Patent No.: US 7,516,657 B2  
(45) Date of Patent: Apr. 14, 2009

(54) APPARATUS FOR INDICATING WIND DIRECTION WITH SOLAR POWER ILLUMINATING DEVICES

(75) Inventor: Quanwei Fan, Guangzhou (CN)

(73) Assignee: Guangzhou Fapu Electronic & Technology Co., Ltd. (CN)

( * ) Notice: Subject to any disclaimer, the term of this patent is extended or adjusted under 35 U.S.C. 154(b) by 96 days.

(21) Appl. No.: 11/625,667

(22) Filed: Jan. 22, 2007

(65) Prior Publication Data

US 2007/0234790 A1  Oct. 11, 2007

(30) Foreign Application Priority Data

Apr. 7, 2006  (CN) .................. 2006 2 0057384 U

(51) Int. Cl.
*G01P 13/00* (2006.01)
*G01P 13/02* (2006.01)

(52) U.S. Cl. .................................................. 73/170.01

(58) Field of Classification Search .. 73/170.01–170.15
See application file for complete search history.

(56) References Cited

U.S. PATENT DOCUMENTS

| 5,231,876 | A | * | 8/1993 | Peet et al. ................. 73/170.08 |
| 5,355,724 | A | * | 10/1994 | Zysko ....................... 73/170.06 |
| 2006/0116102 | A1 | * | 6/2006 | Brown et al. ............. 455/343.1 |

FOREIGN PATENT DOCUMENTS

DE          3404995 A1  *  9/1985

* cited by examiner

*Primary Examiner*—Edward Lefkowitz
*Assistant Examiner*—Jermaine Jenkins
(74) *Attorney, Agent, or Firm*—Barnes & Thornburg LLP

(57) ABSTRACT

Disclosed is an apparatus for indicating wind direction including: a holder, a supportive pole connected to the holder, a wind vane rotatably connected to the supportive pole in view of wind so as to indicate a direction of wind, an orientation indicator rotatably connected to the supportive pole to show the direction of the magnetic pole of the earth, and a solar-power supplier disposed at the holder, which provides power to illuminate the wind van and the orientation indicator.

12 Claims, 2 Drawing Sheets

APPARATUS FOR INDICATING WIND DIRECTION WITH SOLAR POWER ILLUMINATING DEVICES

CROSS REFERENCE TO RELATED APPLICATIONS

The application claims the benefit of Chinese patent application No. 200620057384.1 filed on Apr. 7, 2006 which is explicitly incorporated by reference in its entirety.

BACKGROUND OF THE INVENTION

1. Field of the Invention

This invention relates generally to an apparatus for indicating wind direction, and specifically, to a wind vane with a solar power illuminating device.

2. Description of the Prior Art

Just as its name implies, a wind vane indicates the direction of wind. Normally, the wind vane should be mounted out-of-doors and at an observable place so that people can readily see it from different directions.

A conventional wind vane without illuminating devices will lose its function at night as the wind vane is normally positioned at a place where power is difficult to supply. Though some illuminating devices such as a gas lamp or an oil lamp may be supplied to, they are difficult to be maintained, especially in severe meteorologic conditions.

Though a battery can be provided to illuminate the wind vane, this brings another problem that the battery should be replaced frequently.

Another drawback of the wind vane in the art is that it cannot provide a reference base of the wind direction.

Thus, a new wind vane is needed which provides illumination at night, and is assembled simply.

SUMMARY OF THE INVENTION

The present invention provides an apparatus for indicating a wind direction with a solar illuminating device. According to one embodiment of the present invention, the apparatus comprises: a holder, a supportive pole connected to the holder, a wind vane rotatably connected to the supportive pole in view of wind so as to indicate a direction of wind, an orientation indicator rotatably connected to the supportive pole to show the direction of magnetic pole of the earth, and a solar-power supplier disposed at the holder, which provides power to illuminate the wind van and the orientation indicator.

According to another embodiment of the present invention, there provides an apparatus for indicating wind direction, comprising: a holder comprising an upper portion, a supportive pole connected to the upper portion of the holder, having an upper part and a lower part, a wind vane rotatably connected to the upper part in view of wind so as to indicate a direction of wind, an orientation indicator rotatably connected to the upper part to show the direction of magnetic pole of the earth, and a solar power supplier disposed at the holder, which provides power to illuminate the wind van and the orientation indicator.

According to still another embodiment of the present invention An apparatus for indicating wind direction, comprising a holder having an upper portion and a lower portion, a wind vane rotatably connected to a supportive pole extended upwards from the upper portion in view of wind so as to indicate a direction of wind, an orientation indicator rotatably connected to the supportive pole to show the direction of magnetic pole of the earth, and a solar-power supplier provided by a bird feeder connected to the upper portion, which provides power to illuminate the wind van and the orientation indicator.

In a preferred embodiment of the present invention, the solar power supplier includes a light sensitive switch which automatically turns off the luminotrons by day and turn on the luminotrons by night.

Compared with the prior art, the present invention has the advantages of power saving, simply assembling and multi-functions:

DETAIL DESCRIPTION OF THE INVENTION

Figure 1:
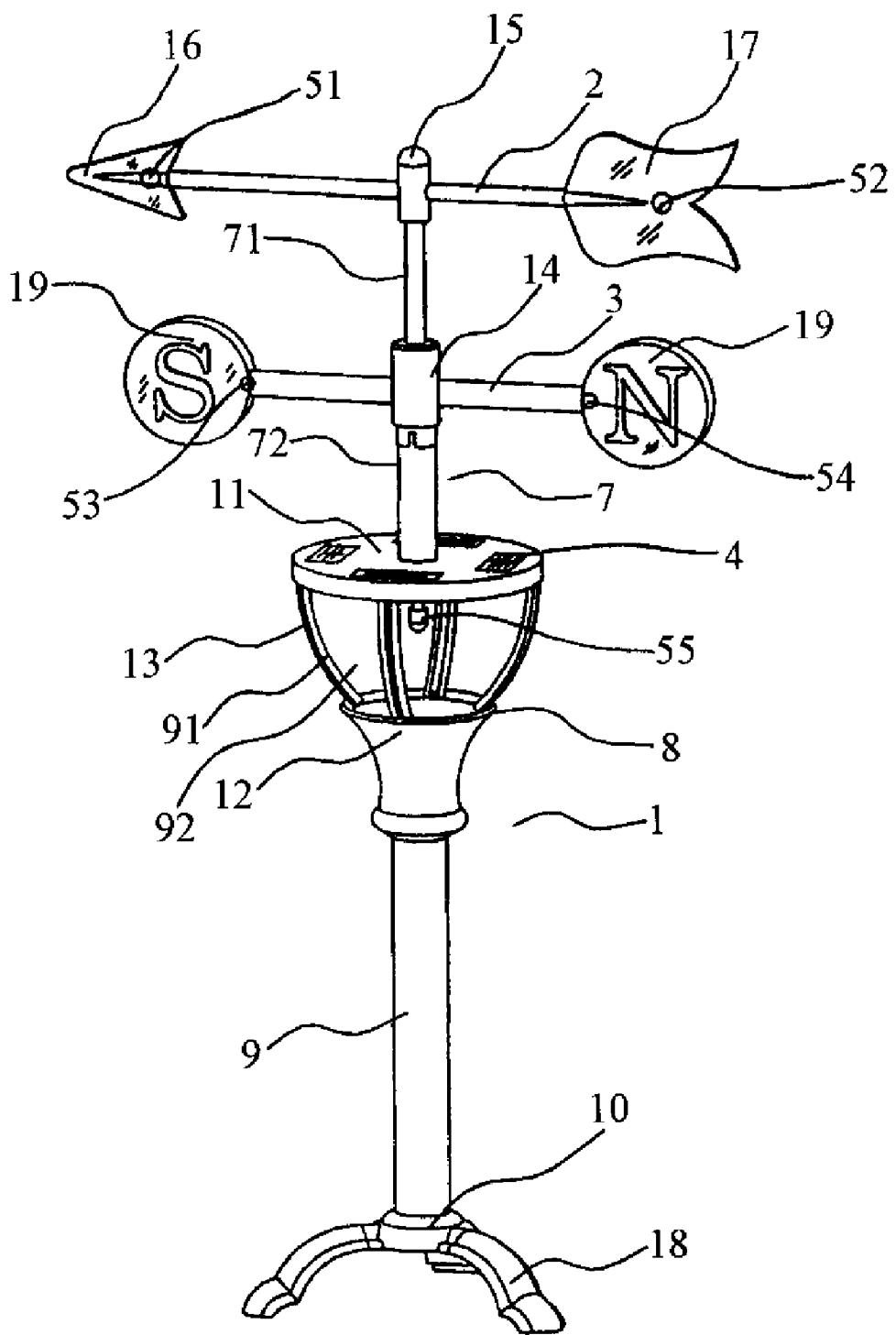
FIG. 1 is a perspective view of an apparatus for indicating wind direction according to one embodiment of the present invention with a wind vane mounted on a holder.

Referring now to FIG. 1, an apparatus for indicating wind direction of an embodiment according to the present invention is described.

As shown in FIG. 1, the apparatus 100 in this embodiment includes a holder 1, and the holder 1 comprises an upper portion 8 and a lower portion 9.

A wind vane indicated by reference numeral 2 for indicating the direction of wind is rotatably connected to a supportive pole 7 at its upper part 71 through a sleeve or bearing 15. In this embodiment, the wind vane 2 is configured as an arrow having a head 16 and a tail 17.

In this embodiment, an orientation indicator 3 is provided to be rotatably connected to the supportive 7 via a rotatable cylinder or a bearing 14. The bearing 14 is provided at the middle of the supportive pole 7 to connect the upper part 71 and a lower part 72 of the supportive pole 7.

The upper portion 8 includes an inverted frustum 91 and a transition member 12 in this embodiment. The inverted frustum 91 provides a top surface 11 and a plurality of supporting bars 13 connecting the top surface 11 to the transition member 12.

On the top surface 11 are mounted a solar power supplier 4 electrically communicated with illuminants 51, 52, 53, 54 disposed at the wind vane 2 and the orientation indicator 3.

As shown in FIG. 1, the lower portion 9 provides a base 10 having three supporting legs 18 positioned at 120° with each other, to keep the apparatus standing stably.

Between two adjacent supporting bars forms a sidewall 92 of the inverted frustum 91 which can be made from transparent materials like glass or plastics.

In this embodiment, an illuminant 55 is also provided at the back of the top surface 11.

The solar power supplier 4 used in the present invention can be those well known for one of ordinary skill in the art such as one or more solar cells. The solar power supplier 4 is mounted on the top surface 11 at a place where it can receive the sunlight. In the night, the solar power supplier initiates the illuminants by a light sensitive switch (not shown) which is well know for one of ordinary skill in the art.

The orientation indicator can be made of magnetic materials in the present invention like a permanent magnet so that two ends 19 of the orientation indicator (letters S and N) always indicate the south and north direction.

Figure 2:
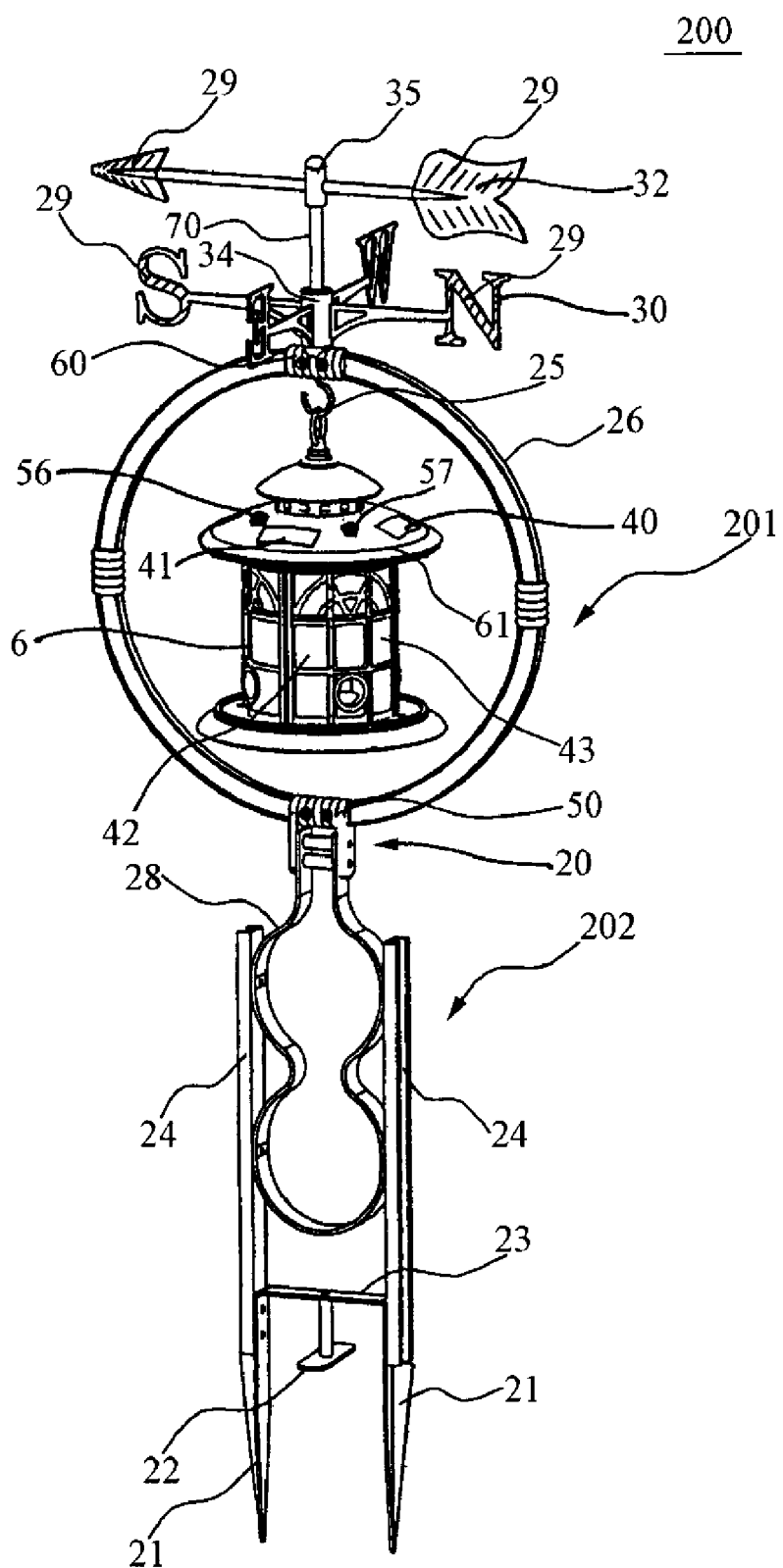
FIG. 2 is a perspective view of an apparatus for indicating wind direction according to another embodiment of the present invention with a wind vane mounted on another holder.

Another embodiment according to the present invention is shown in FIG. 2. In this embodiment, an apparatus 200 includes a holder 20 which includes an upper portion 201 and a lower portion 202.

A supportive pole 70 is connected to the upper portion 201. A wind vane 32 is rotatably connected to the supportive pole 70 at the top thereof via a sleeve or a bearing 35, and an orientation indicator 30 is also rotatably connected to the supportive pole 70 through a rotatable cylinder or bearing 34.

As shown in FIG. 2, in this embodiment, the upper portion 201 is configured as a ring 26. A bird feeder 6 is hung to the upper portion 201 by a hook 25.

The bird feeder 6 provides an arc top surface 61, on which solar cells 56, 57 and illuminants 40, 41 powered by the solar cells are mounted.

In this embodiment, the wind vane 32 and the orientation indicator 30 are coated with or made from illuminating materials 29 that will be illuminating under the irradiation of the illuminants 40 and 41.

The lower portion 202 in this embodiment is configured to provide two supports 24 and a center portion 28 connected to the ring 26. The center portion 28 is configured in an 8 shape and sandwiched by the two supports 24. The two supports 24 extend downwards to form two insertion feet 21 having a sharp end which can be inserted into the ground.

Between the two supports may provide a rail 23 to which a pedal 22 is connected. With the pedal 22 the apparatus can be readily inserted into the ground.

In another embodiment, the holder 20 further comprises a connector 50 disposed between the lower portion 202 and the upper portion 202 so that the lower 202 can be foldingly connected to the upper portion 201 with the connector 50. In this way, the apparatus of the present invention can be folded to be portable by removing the bird feeder. In another embodiment, a connector 60 is provided so that the upper portion can be folded into the upper portion 26 when the bird feeder is removed.

A plurality of illuminants 42, 43 can be provided at a side of the bird feeder 6 to light the bird feeder 6.

It is understood that the above embodiments and the description thereon are merely intended to describe the invention, but the invention is not limited thereto. It is also appreciated by one of ordinary skill in the art that variations or modifications to the invention be made without departing from the spirit and principle of the invention.

The invention claimed is:

1. An apparatus for indicating wind direction comprising:
a holder;
a supportive pole connected to the holder;
a wind vane rotatably connected to the supportive pole in view of wind so as to indicate a direction of wind;
an orientation indicator rotatably connected to the supportive pole to show the direction of magnetic pole of the earth; and
a solar-power supplier disposed at the holder, which provides power to illuminate the wind vane and the orientation indicator
wherein a plurality of illuminants electronically communicated with the solar power supplier are amounted on the wind vane and/or the orientation indicator.

2. An apparatus for indicating wind direction comprising:
a holder;
a supportive pole connected to the holder;
a wind vane rotatably connected to the supportive pole in view of wind so as to indicate a direction of wind;
an orientation indicator rotatably connected to the supportive pole to show the direction of magnetic pole of the earth; and
a solar-power supplier disposed at the holder, which provides power to illuminate the wind vane and the orientation indicator
wherein the solar power supplier comprises one or more solar cells and a plurality of illuminants, and each of the wind vane and the orientation indicator is coated with illuminating materials which is adapted to be illuminated by the illuminants.

3. An apparatus for indicating wind direction, comprising:
a holder having an upper portion and a lower portion;
a wind vane rotatably connected to a supportive pole extended upwards from the upper portion in view of wind so as to indicate a direction of wind;
an orientation indicator rotatably connected to the supportive pole to show the direction of magnetic pole of the earth; and
a solar-power supplier provided by a bird feeder connected to the upper portion, which provides power to illuminate the wind vane and the orientation indicator
wherein the bird feeder provides a top surface, and the solar power supplier comprises one or more solar cells and a plurality of illuminants amounted on the top surface.

4. The apparatus according to claim 3, wherein each of the wind vane and the orientation indicator is coated with an illuminating material.

5. The apparatus according to claim 4, wherein the bird feeder comprises one or more illuminants disposed at a sidewall thereof.

6. The apparatus according to claim 3, wherein each of the wind vane and the orientation indicator is connected to the upper potion by a bearing.

7. The apparatus according to claim 3, wherein the upper portion is configured as a ring.

8. The apparatus according to claim 7, wherein the lower portion comprises two supports and a center part connected therebetween, and the center part configured in an 8 shape is connected to the ring.

9. The apparatus according to claim 8, wherein the two supports extend downwards to form two insertion feet having a sharp end which is adapted to be inserted into the ground.

10. The apparatus according to claim 9, wherein between the two supports provides a rail to which a pedal is connected.

11. The apparatus according to claim 8, wherein the center part is adapted to be folded with respect to the ring.

12. The apparatus according to claim 11, wherein the ring is adapted to be folded with respect to the supportive pole.

* * * * *